(12) United States Patent
Wu

(10) Patent No.: US 11,417,138 B2
(45) Date of Patent: Aug. 16, 2022

(54) FINGERPRINT IDENTIFICATION APPARATUS, DISPLAY APPARATUS, AND ELECTRONIC DEVICE

(71) Applicant: GUANGDONG OPPO MOBILE TELECOMMUNICATIONS CORP., LTD., Guangdong (CN)

(72) Inventor: Anping Wu, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 134 days.

(21) Appl. No.: 16/935,806

(22) Filed: Jul. 22, 2020

(65) Prior Publication Data

US 2020/0349333 A1 Nov. 5, 2020

Related U.S. Application Data

(63) Continuation of application No. PCT/CN2019/083488, filed on Apr. 19, 2019.

(30) Foreign Application Priority Data

Apr. 23, 2018 (CN) .......................... 201810368842.0

(51) Int. Cl.
*G06V 40/13* (2022.01)
*G01S 15/89* (2006.01)
(Continued)

(52) U.S. Cl.
CPC ...... *G06V 40/1306* (2022.01); *G01S 15/8913* (2013.01); *G01S 15/8918* (2013.01);
(Continued)

(58) Field of Classification Search
CPC . H04B 11/00; H04M 1/0266; H04M 2250/22; G06F 3/041; G01S 15/8918; G01S 15/8913; G06V 40/1306
See application file for complete search history.

(56) References Cited

U.S. PATENT DOCUMENTS 5,907,148 A * 5/1999 Iwafuchi ............ G06K 7/10732
235/472.01
9,984,271 B1 * 5/2018 King ...................... G06V 10/17
(Continued)

FOREIGN PATENT DOCUMENTS

CN 104035620 A 9/2014
CN 204028936 U 12/2014
(Continued)

OTHER PUBLICATIONS

Extended European Search Report for EP Application 19791526.7 dated Mar. 5, 2021. (8 pages).
(Continued)

*Primary Examiner* — Dominic E Rego
(74) *Attorney, Agent, or Firm* — Young Basile Hanlon & MacFarlane, P.C.

(57) ABSTRACT

An electronic device includes: a cover glass, including a first side and a second side; an ultrasonic wave transmitter and an ultrasonic wave receiver, arranged on the second side of the cover glass. Orthographic projections of the ultrasonic wave transmitter and the ultrasonic wave receiver onto the cover glass may be at two opposing ends of the cover glass. The ultrasonic wave transmitter is configured to emit an ultrasonic wave, the ultrasonic wave is able to enter the cover glass from an end, reflected between the first side and the second side for a plurality of times, emitted out of the cover glass from another end, and received by the ultrasonic wave receiver.

19 Claims, 8 Drawing Sheets

(51) Int. Cl.
  *H04B 11/00* (2006.01)
  *G06F 3/041* (2006.01)
  *H04M 1/02* (2006.01)
(52) U.S. Cl.
  CPC ............. *G06F 3/041* (2013.01); *H04B 11/00* (2013.01); *H04M 1/0266* (2013.01); *H04M 2250/22* (2013.01)

(56) References Cited

U.S. PATENT DOCUMENTS

| | | | | |
|---|---|---|---|---|
| 2004/0232363 | A1* | 11/2004 | Sautter | B60S 1/0822 250/573 |
| 2011/0049139 | A1* | 3/2011 | Jiang | H04M 1/026 220/4.01 |
| 2012/0018325 | A1* | 1/2012 | Kim | A45C 11/00 206/320 |
| 2013/0168454 | A1* | 7/2013 | Oh | B42D 25/435 235/487 |
| 2014/0081521 | A1* | 3/2014 | Frojdh | B60R 16/037 701/36 |
| 2014/0099996 | A1* | 4/2014 | Houryu | H04M 1/0202 455/566 |
| 2015/0219478 | A1* | 8/2015 | Raschke | G01B 21/16 73/431 |
| 2017/0106673 | A1* | 4/2017 | Fujimori | B41J 11/06 |
| 2017/0370835 | A1* | 12/2017 | Di Marco | G08B 17/103 |
| 2018/0060635 | A1* | 3/2018 | Li | G06T 5/006 |
| 2018/0101711 | A1* | 4/2018 | D'Souza | G06V 30/142 |
| 2018/0196982 | A1* | 7/2018 | Panchawagh | G06V 40/1353 |
| 2018/0268187 | A1* | 9/2018 | Jeong | G06V 40/1306 |
| 2018/0373913 | A1* | 12/2018 | Panchawagh | G01S 7/52079 |
| 2019/0079186 | A1* | 3/2019 | Taghibakhsh | B06B 1/0688 |
| 2019/0102046 | A1* | 4/2019 | Miranto | H04L 63/0861 |
| 2019/0205597 | A1 | 7/2019 | Tomeno | |

FOREIGN PATENT DOCUMENTS

| | | |
|---|---|---|
| CN | 104751121 A | 7/2015 |
| CN | 105184248 A | 12/2015 |
| CN | 105184282 A | 12/2015 |
| CN | 105844233 A | 8/2016 |
| CN | 106127101 A | 11/2016 |
| CN | 106156581 A | 11/2016 |
| CN | 106156582 A | 11/2016 |
| CN | 107463900 A | 12/2017 |
| CN | 107563306 A | 1/2018 |
| CN | 107665068 A | 2/2018 |
| CN | 107832599 A | 3/2018 |
| CN | 107918450 A | 4/2018 |
| CN | 108667963 A | 10/2018 |
| JP | 2007041659 A | 2/2007 |
| TW | M545308 U | 7/2017 |
| WO | 2018047710 A1 | 3/2018 |

OTHER PUBLICATIONS

Indian First Examination Report for IN Application 202017032768 dated Jul. 6, 2021. (6 pages).
English translation of Chinese First Office Action and Written Opinion for related Chinese application No. 201810368842.0, dated Feb. 14, 2019 (7 pages).
International Search Report and Written Opinion for related International application No. PCT/CN2019/083488, dated Jul. 19, 2019 (3 pages).

* cited by examiner

FINGERPRINT IDENTIFICATION APPARATUS, DISPLAY APPARATUS, AND ELECTRONIC DEVICE

CROSS-REFERENCE TO RELATED APPLICATION(S)

The present application is a continuation application of International (PCT) Patent Application No. PCT/CN2019/083488, filed on Apr. 19, 2019, which claims priority to Chinese Patent Application No. 201810368842.0, filed on Apr. 23, 2018, the entire contents of both of which are hereby incorporated by reference in their entireties.

TECHNICAL FIELD

The present disclosure relates to the field of electronic technologies, and in particular to a fingerprint identification apparatus, a display apparatus, and an electronic device.

BACKGROUND

Electronic devices, such as a mobile phone, have become increasingly important in people's daily lives. The mobile phone may bring convenience to people's daily lives and store a large amount of private information of a user. Therefore, identification of the user may be highly significant. Fingerprint identification may have a high identification speed and high identification accuracy, and therefore, the fingerprint identification may be a most commonly used method to verify the user's identity.

SUMMARY

According to a first aspect of the present disclosure, a fingerprint identification apparatus is provided and includes: a cover glass, an ultrasonic wave transmitter and an ultrasonic wave receiver. The cover glass may include a first side and a second side opposing to the first side. The ultrasonic wave transmitter and the ultrasonic wave receiver may be arranged to face the second side of the cover glass. An orthographic projection of the ultrasonic wave transmitter onto the cover glass and an orthographic projection of the ultrasonic wave receiver onto the cover glass are located at two opposing ends of the cover glass, and the ultrasonic wave transmitter is configured to emit an ultrasonic wave. When fingerprint identification is being performed, the ultrasonic wave enters the cover glass at one end of the cover glass and emerges on the other end of the cover glass, and the ultrasonic wave is being reflected between the first side and the second side until the ultrasonic wave is received by the ultrasonic wave receiver.

According to a second aspect of the present disclosure, a display apparatus capable of performing fingerprint identification is provided and includes a display screen module, an ultrasonic wave transmitter and an ultrasonic wave receiver. The display screen module comprises a cover glass and a display panel covered by the cover glass. The cover glass includes a body portion and a guide portion arranged at an edge of the body portion. The ultrasonic wave transmitter and the ultrasonic wave receiver are arranged on a same side of the cover glass and at two opposing ends of the same side of the cover glass. The ultrasonic wave transmitter is configured to define a nozzle, the nozzle of the ultrasonic wave transmitter faces the guide portion, and the ultrasonic wave transmitter is configured to emit an ultrasonic wave to the cover glass through the nozzle of the ultrasonic wave transmitter. When fingerprint identification is being performed, the ultrasonic wave propagates through the cover glass and is being reflected within the cover glass. The ultrasonic wave receiver is configured to define a nozzle, the nozzle of the ultrasonic wave receiver directly faces the guide portion, and the ultrasonic wave receiver is configured to receive the ultrasonic wave emitted out of the cover glass. The ultrasonic wave is configured to collect fingerprint information of a user.

According to a third aspect of the present disclosure, an electronic device is provided and includes a shell, a display screen module, an ultrasonic wave transmitter, and an ultrasonic wave receiver. The display screen module includes a cover glass and a display panel covered by the cover glass. The display screen module is engaged with the shell to define a receiving space, and the cover glass includes a body portion and a guide portion arranged at an edge of the body portion. The ultrasonic wave transmitter and the ultrasonic wave receiver are received in the receiving space. The ultrasonic wave transmitter is configured to emit an ultrasonic wave, and the ultrasonic wave receiver is configured to receive the ultrasonic wave. When ultrasonic wave transmitter emits the ultrasonic wave towards the cover glass, the ultrasonic wave is being reflected by the guide portion and directed by the guide portion to enter the cover glass and propagates to reach the ultrasonic wave receiver. The ultrasonic wave is configured to collect fingerprint information of a user.

BRIEF DESCRIPTION OF DRAWINGS

To further illustrate technical solutions of embodiments of the present disclosure more clearly, drawings of the embodiments will be briefly introduced hereinafter. Obviously, following drawings shows some embodiments of the present disclosure, to any one of skill in the art, other drawings may be obtained based on the provided drawings without any creative work.

DETAILED DESCRIPTION

Figure 1:
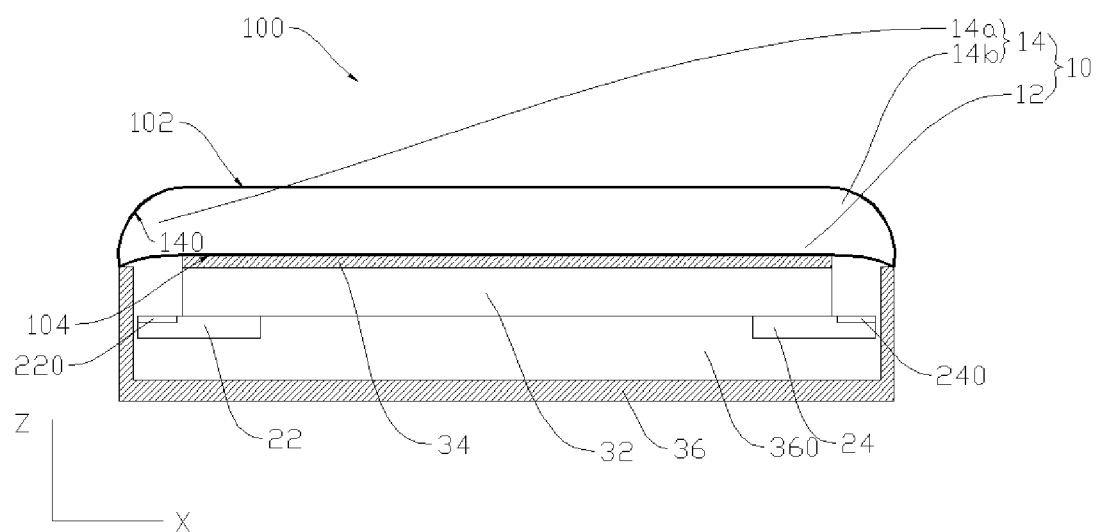
FIG. 1 is a structural schematic view of a top view of an electronic device according to a first embodiment of the present disclosure.

According to a first aspect of the present disclosure, a fingerprint identification apparatus is provided and includes:

a transparent cover, an acoustic wave generator and an acoustic wave receiver. The transparent cover may include a first side face and a second side face opposite to the first side face. The acoustic wave generator and the acoustic wave receiver may be arranged to face the second side face of the transparent cover. An orthographic projection of the ultrasonic wave transmitter onto the cover glass and an orthographic projection of the ultrasonic wave receiver onto the cover glass are located at two opposing ends of the cover glass, and the ultrasonic wave transmitter is configured to emit an ultrasonic wave. When fingerprint identification is being performed, the ultrasonic wave enters the cover glass at one end of the cover glass and emerges on the other end of the cover glass, and the ultrasonic wave is being reflected between the first side and the second side until the ultrasonic wave is received by the ultrasonic wave receiver.

In some embodiments, the cover glass includes a body portion and a guide portion, and the body portion and the guide portion are integrally connected with each other. The guide portion is arranged at an edge of the body portion. The first side and the second side are arranged on the body portion. The first side is configured to extend along the guide portion to form a guide face, and the guide face is inclined to the first side. The guide face is configured to direct ultrasonic wave in or out of the body portion by reflecting the ultrasonic wave.

In some embodiments, the guide portion includes a first guide portion and a second guide portion. The first guide portion and the second guide portion are disposed at two opposite ends of the body portion. The ultrasonic wave transmitter directly faces the first guide portion and the ultrasonic wave receiver directly faces the second guide portion.

In some embodiments, multiple ultrasonic wave transmitters are distributed along a length direction of the first guide portion. Multiple ultrasonic wave receivers are distributed along a length direction of the second guide portion. Each ultrasonic wave transmitter corresponds to one ultrasonic wave receiver.

In some embodiments, the ultrasonic wave transmitter is in a shape of a strip, and a length direction of the ultrasonic wave transmitter is parallel to a length direction of the first guide portion. The ultrasonic wave receiver is in a shape of a strip, and a length direction of the ultrasonic wave receiver is parallel to a length direction of the second guide portion.

In some embodiments, the first guide portion and the second guide portion are arranged at two ends along a length direction of the body portion.

In some embodiments, the first guide portion and the second guide portion are arranged at two ends along a width direction of the body portion.

In some embodiments, the electronic device further includes a display panel positioned between the cover glass and the ultrasonic wave transmitter. The display panel directly faces the body portion. The orthographic projection of the ultrasonic wave transmitter onto the cover glass and an orthographic projection of the display panel onto the cover glass are at least partially overlapped.

In some embodiments, the orthographic projection of the ultrasonic wave receiver onto the cover glass and the orthographic projection of the display panel onto the cover glass are at least partially overlapped.

In some embodiments, the electronic device further includes a touch panel, arranged on the second side.

According to a second aspect of the present disclosure, a display apparatus, capable of performing fingerprint identification, is provided and includes a display screen module, an ultrasonic wave transmitter and an ultrasonic wave receiver. The display screen module comprises a cover glass and a display panel covered by the cover glass. The cover glass includes a body portion and a guide portion arranged at an edge of the body portion. The ultrasonic wave transmitter and the ultrasonic wave receiver are arranged on a same side of the cover glass and at two opposing ends of the same side of the cover glass. The ultrasonic wave transmitter is configured to define a nozzle, the nozzle of the ultrasonic wave transmitter faces the guide portion, and the ultrasonic wave transmitter is configured to emit an ultrasonic wave to the cover glass through the nozzle of the ultrasonic wave transmitter. When fingerprint identification is being performed, the ultrasonic wave propagates through the cover glass and is being reflected within the cover glass. The ultrasonic wave receiver is configured to define a nozzle, the nozzle of the ultrasonic wave receiver faces the guide portion, and the ultrasonic wave receiver is configured to receive the ultrasonic wave emitted out of the cover glass. The ultrasonic wave is configured to collect fingerprint information of a user.

In some embodiments, the cover glass includes a first side and a second side opposing to the first side. The first side is arranged to serve as at least a part of an appearance surface of the electronic device. The ultrasonic wave transmitter and the ultrasonic wave receiver are arranged closer to the second side rather than the first side. A fingerprint identification area is defined on the first side.

In some embodiments, the body portion and the guide portion are connected to each other forming an integral structure. The first side and the second side are two opposing sides of the body portion. The first side is configured to extend towards the guide portion to form the guide face. The guide face is configured to be curved, tilted to the second side, and reflect the ultrasonic wave to guide the ultrasonic wave to an inside of the body portion and to guide the ultrasonic wave from the inside to an outside of the body portion.

In some embodiments, the guide portion includes a first guide portion and a second guide portion, symmetrically arranged at two opposing ends of the body portion. The nozzle of the ultrasonic wave transmitter is defined to face the first guide portion, and the nozzle of the ultrasonic wave receiver is defined to face the second guide portion.

In some embodiments, the display panel is positioned between the cover glass and the ultrasonic wave transmitter. The display panel is arranged to not cover the nozzle of the ultrasonic wave transmitter, such that the nozzle of the ultrasonic wave transmitter is exposed to the first guide portion directly.

In some embodiments, the display panel is arranged between the cover glass and the ultrasonic wave receiver, and the display panel is arranged to not cover the nozzle of the ultrasonic wave receiver, such that the nozzle of the ultrasonic wave receiver is exposed to the second guide portion directly.

According to a third aspect of the present disclosure, an electronic device is provided and includes a shell, a display screen module, an ultrasonic wave transmitter, and an ultrasonic wave receiver. The display screen module includes a cover glass and a display panel covered by the cover glass. The display screen module is engaged with the shell to define a receiving space, and the cover glass includes a body portion and a guide portion arranged at an edge of the body portion. The ultrasonic wave transmitter and the ultrasonic wave receiver are received in the receiving space. The ultrasonic wave transmitter is configured to emit an ultrasonic wave, and the ultrasonic wave receiver is configured to receive the ultrasonic wave. When ultrasonic wave transmitter emits the ultrasonic wave towards the cover glass, the ultrasonic wave is being reflected by the guide portion and directed by the guide portion to enter the cover glass and propagates to reach the ultrasonic wave receiver. The ultrasonic wave is configured to collect fingerprint information of a user.

In some embodiments, the guide portion is arranged at two ends of the body portion, and the guide portion is arranged to face the ultrasonic wave transmitter or the ultrasonic wave receiver.

In some embodiments, the ultrasonic wave transmitter defines a nozzle to emit the ultrasonic wave, and the ultrasonic wave receiver defines a nozzle to receive the ultrasonic wave. The display panel is arranged between the cover glass and the ultrasonic wave transmitter and between the cover glass and the ultrasonic wave receiver. The display panel is arranged to not cover the nozzle of the ultrasonic wave transmitter and the nozzle of the ultrasonic wave receiver, such that the nozzle of the ultrasonic wave transmitter is exposed to the first guide portion directly, and the nozzle of the ultrasonic wave receiver is exposed to the second guide portion directly.

In some embodiments, the body portion and the guide portion are connected to each other forming an integral structure; and the guide portion has a guide face, the guide face is curved and configured to reflect the ultrasonic wave to guide the ultrasonic wave to an inside of the body portion and to guide the ultrasonic wave from the inside to an outside of the body portion.

The electronic device provided in the present disclosure includes, but is not limited to, a smart mobile phone, a mobile internet device (MID), an electronic book, a play station portable (PSP), a personal digital assistant (PDA), and the like. In the present embodiment, the electronic device may be the smart mobile phone. Specifically, the electronic device provided by embodiments of the present disclosure may have a fingerprint identification function. The electronic device may identify fingerprint information of a user to determine an identity of the user, such that a screen may be unlocked, and operations such as mobile payment, data transmission, and the like may be performed, improving security of the mobile phone.

Figure 2:
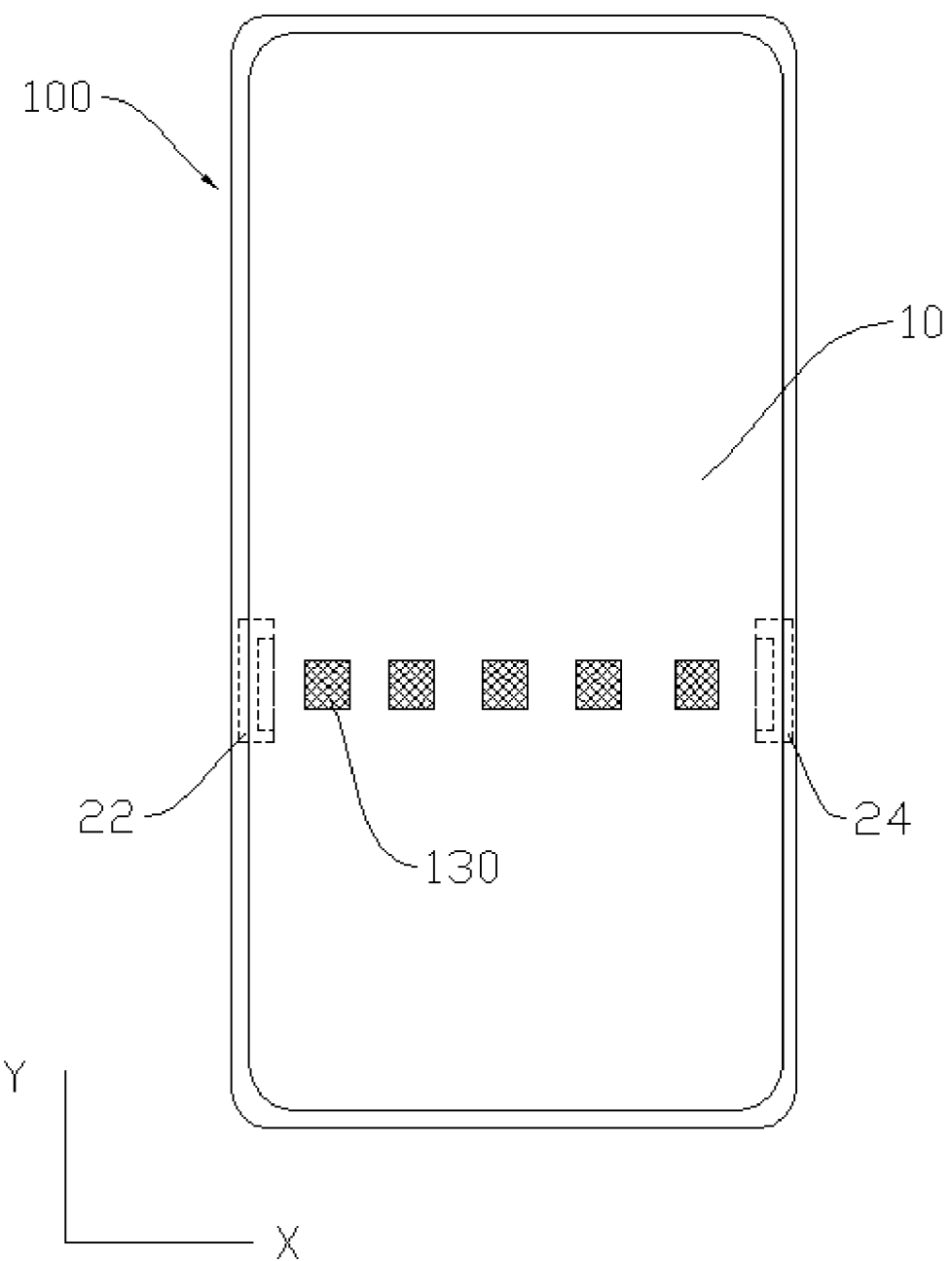
FIG. 2 is a structural schematic view of a front view of the electronic device according to the first embodiment shown in FIG. 1.

As shown in FIG. 1 and FIG. 2, an electronic device 100 may be provided and include a cover glass 10, an ultrasonic wave transmitter 22, an ultrasonic wave receiver 24, and a display panel 32. Specifically, in the present embodiment, the cover glass 10 may include a first side 102 and a second side 104. Specifically, the first side 102 may be a surface of the cover glass 10 facing an outside of the electronic device 100. The second side 104 may be a surface of the cover glass 10 facing an inside of the electronic device 100. In one embodiment, the cover glass 10 may be made of glass, such as tempered glass and the like, having high light transmittance and certain strength, such that components covered by the cover glass 10, such as the display panel 32 and the like, may be protected. In other embodiments, a cover of the electronic device 100 may be made of plastics or other material having high transparency.

Further, as shown in FIG. 1 and FIG. 2, the ultrasonic wave transmitter 22 and the ultrasonic wave receiver 24 may be arranged to face the second side 104 of the cover glass 10. An orthographic projection of the ultrasonic wave transmitter 22 and an orthographic projection of the ultrasonic wave receiver 24 onto the cover glass 10 may be positioned at two opposing ends of the cover glass 10. Specifically, the ultrasonic wave transmitter 22 may be configured to generate an ultrasonic wave, and the ultrasonic wave receiver 24 may be configured to receive the ultrasonic wave. In one embodiment, the ultrasonic wave transmitter 22 may generate an ultrasonic wave, and the ultrasonic wave receiver 24 may receive the ultrasonic wave. The ultrasonic wave may not be recognized by human ears. In such a way, a user of the electronic device 100 may not hear noise during the electronic device 100 performing fingerprint identification, and a possibility of a sound generated by the ultrasonic wave transmitter 22 and a sound generated by a loudspeaker or a microphone being mixed to impact other functions of the electronic device 100 may be reduced. Specifically, as shown in FIG. 2, in the present embodiment, a nozzle 220 of the ultrasonic wave transmitter 22 may be defined to face the cover glass 10, such that the ultrasonic wave emitted out of the nozzle 220 of the ultrasonic wave transmitter 22 may propagate to the cover glass 10 directly, and an ultrasonic wave loss during the ultrasonic wave propagating from the ultrasonic wave transmitter 22 to the cover glass 10 may be reduced. A nozzle 240 of the acoustic receiver 24 may be defined to face towards the cover glass 10, such that the ultrasonic wave propagating out of the cover glass 10 may propagate into the nozzle 240 of the ultrasonic wave receiver 24 directly, and an ultrasonic wave loss during the ultrasonic wave propagating from the cover glass 10 to the ultrasonic wave receiver 24 may be reduced.

Figure 3:
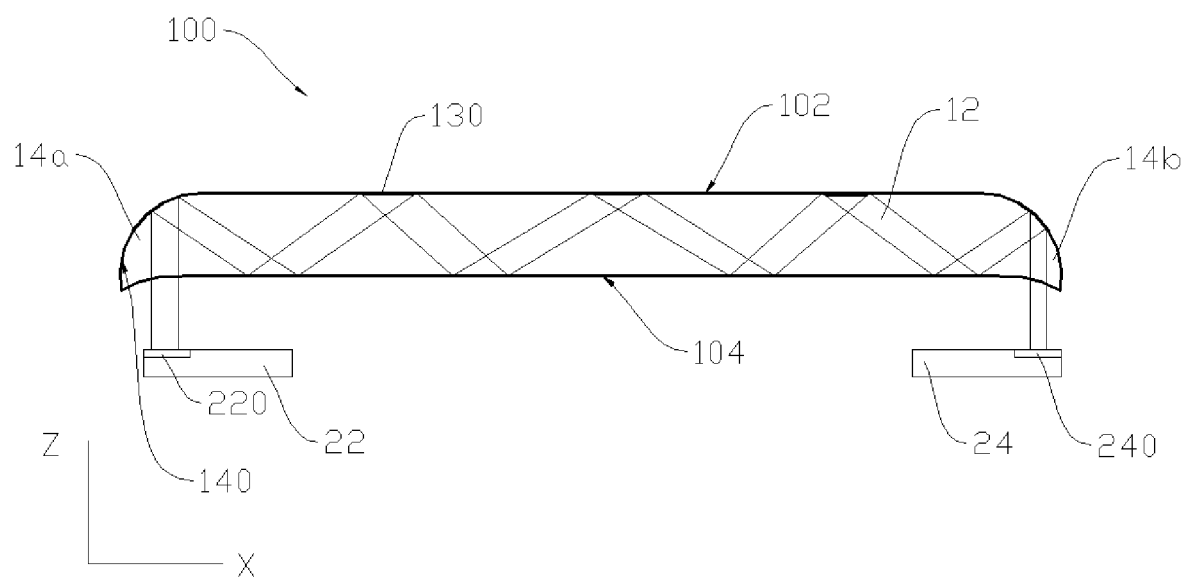
FIG. 3 is a schematic view of a propagation path an ultrasonic wave according to the first embodiment shown in FIG. 1.

As shown in FIG. 3, the ultrasonic wave transmitter 22 may emit the ultrasonic wave to the cover glass 10. The ultrasonic wave may be reflected between the first side 102 and the second side 104 and may be received by the ultrasonic wave receiver 24. Specifically, the ultrasonic wave emitted from the ultrasonic wave transmitter 22 may enter the cover glass 10 from an end of the cover glass 10 and may emerge out of the cover glass 10 from another end of the cover glass 10 and received by the ultrasonic wave receiver 24. The ultrasonic wave may be reflected between the first side 102 and the second side 104 for a plurality of times. In such a way, a fingerprint identification area 130 may be defined on the first side 102. When a finger of the user touches the fingerprint identification area 130, a reflection effect of the ultrasonic wave caused by a ridge and a groove of a fingerprint may be different, and the ultrasonic wave receiver 24 may receive various ultrasonic wave information, such that fingerprint information of the user may be identified. In the present embodiment, the number of times the ultrasonic wave being reflected by the first side 102 may determine the number of fingerprint identification areas 130 defined on the first side 102. Specifically, the greater the number of times the ultrasonic wave being reflected by the first side 102, the greater the number of fingerprint identification areas 130 defined on the first side 102. In one embodiment, the number of times the ultrasonic wave being reflected by the first side 102 may be changed by changing an angle of the ultrasonic wave entering the cover glass 10. In other words, by increasing the angle of the ultrasonic wave entering the cover glass 10, i.e., an angel between a propagation path of the ultrasonic wave entering the cover glass 10 and the first side 102, the number of times the ultrasonic wave being reflected by the first side 102 may be increased, the number of fingerprint identification areas 130 may be increased, an arrangement of the fingerprint identification areas 130 may be denser, such that practicability and an efficiency of fingerprint identification may be improved while being used by the user. By decreasing the angle of the ultrasonic wave entering the cover glass 10, the number of fingerprint identification areas 130 may be reduced, a distance of the ultrasonic wave propagating from one end of the cover glass 10 to another end of the cover glass 10 may be decreased, the ultrasonic wave loss may be reduced, and accuracy of fingerprint identification may be improved. In one embodiment, the first side 102 and the second side 104 of the cover glass 10 may be flat. In other embodiments, the first side 102 and the second side 104 may be curved. When the first side 102 and the second side 104 are curved, a radian of the first side 102 may be equal to a radian of the second side 104, and the curved first side 102 and the curved second side 104 may be parallel to each other, such that a distance between various positions of the first side 102 and corresponding various positions of the second side 104 may be identical. Specifically, each point of the first side 102 may have an orthographic projection point on the second side 104 correspondingly. Distances between each point and the corresponding orthographic projection point may be identical. A plurality of fingerprint identification areas 130 may be defined on the first side 102 by reflecting the ultrasonic wave, and distances between every two adjacent fingerprint identification areas 130 may be identical. In the first embodiment, the plurality of fingerprint identification areas 130 may be evenly distributed on the first side 102 along a width direction (i.e., an X direction shown in FIGS. 1 and 2) of the first side 102, such that the user may easily reach the fingerprint identification area 130 on the electronic device 100, improving an efficiency of unlocking the electronic device 100.

According to the present embodiment, the ultrasonic wave transmitter 22 may generate the ultrasonic wave, the ultrasonic wave may enter the cover glass 10 from an end of the cover glass 10, and may be emitted out of the cover glass 10 from another end of the cover glass 10 and received by the ultrasonic wave receiver 24. The ultrasonic wave may be reflected between the first side 102 and the second side 104 for a plurality of times, such that the plurality of fingerprint identification areas 130 may be defined on the first side 102. When the user uses the finger to touch the fingerprint identification area 130, the reflection effect of the ultrasonic wave caused by the ridge and the groove of the fingerprint may be different, and the ultrasonic wave receiver 24 may receive various ultrasonic wave information, such that fingerprint information of the user may be identified. It may be noted that the ultrasonic wave transmitter 22 and the ultrasonic wave receiver 24 may be arranged to face an edged region of the cover glass 10, such that an area of the cover glass 10 occupied by projections of the ultrasonic wave transmitter 22 and the ultrasonic wave receiver 24 may be reduced. Correspondingly, a display area of the electronic device 100 may not be occupied, such that the electronic device 100 may exhibit the fingerprint identification function without impacting a screen-to-body ratio.

As shown in FIG. 1, in the present embodiment, the display panel 32 may be arranged between the cover glass 10 and the ultrasonic wave transmitter 22. That is, the display panel 32 may be arranged between the cover glass 10 and the ultrasonic wave receiver 24. The display panel 32 may be configured to display images. Specifically, the display panel 32 may be, but is not limited to, a liquid crystal display (LCD) panel 32 or an organic light emitting diode (OLED) display panel 32. In the present embodiment, a displaying face of the display panel 32 may face towards the cover glass 10 to display images to the outside of the electronic device 100.

As shown in FIG. 1 and FIG. 2, the ultrasonic wave transmitter 22 and the ultrasonic wave receiver 24 may be arranged on a side of the display panel 32 opposing to the cover glass 10. That is, the ultrasonic wave transmitter 22 and the cover glass 10 may be arranged along a thickness direction (a Z-direction shown in FIG. 1) of the electronic device 100, and the ultrasonic wave receiver 24 and the cover glass 10 may be arranged along a thickness direction (a Z-direction shown in FIG. 1) of the electronic device 100 may be arranged along the thickness direction (a Z-direction shown in FIG. 1) of the electronic device 100, such that the surface area of the cover glass 10 may not be occupied, and that is, an area of an X-Y plane of the cover glass 10 shown in FIG. 2 may not be occupied. As the ultrasonic wave transmitter 22 and the ultrasonic wave receiver 24 may be arranged to face an edged region of the cover glass 10, projections of the ultrasonic wave transmitter 22 and the ultrasonic wave receiver 24 onto the surface of the cover glass 10 may be reduced. As the display area of the electronic device 100 may correspond to the surface area of the cover glass 10, the display area may not be occupied by the projections of the ultrasonic wave transmitter 22 and the ultrasonic wave receiver 24. In such a way, the electronic device 100 may exhibit the fingerprint identification function, and the screen-to-body ratio may not be impacted at the same time.

As shown in FIG. 1 and FIG. 2, the cover glass 10 may further include a body portion 12 and a guide portion 14, and the body portion 12 and a guide portion 14 are integrally connected with each other. The guide portion 14 may be arranged at an edge of the body portion 12. In the present embodiment, the body portion 12 and the guide portion 14 may be an integrated structure. The first side 102 and the second side 104 may be two opposing side faces of the body portion 12. The first side 102 may extend along the guide portion 14 to form a guide face 140. The guide face 140 may be inclined to the first side 102. The guide face 140 may be configured to reflect the ultrasonic wave to direct the ultrasonic wave to an inside of the body portion 12 or to an outside of the body portion 12. Specifically, as shown in FIG. 1, two guide portions 14 may be arranged at two ends of the body portion 12. One of the two guide portions 14 may be arranged to face towards the ultrasonic wave transmitter 22, and the other of the two guide portions 14 may be arranged to face towards the ultrasonic wave receiver 24. As shown in FIG. 3, the ultrasonic wave emitted by the ultrasonic wave transmitter 22 may enter the cover glass 10 from the end of the cover glass 10 along a direction perpendicular to the second side 104 of the cover glass 10 and may be reflected by the guide face 140, such that the ultrasonic wave may be reflected between the first side 102 and the second side 104 for a plurality of times and may propagate to the another end of the cover glass 10. When the ultrasonic wave propagates to reach the another end of the cover glass 10, the ultrasonic wave may be reflected by the guide face 140 and may be emitted out of the cover glass 10 along the direction perpendicular to the second side 104 of the cover glass 10. In one embodiment, the guide face 140 may be inclined to the first side 102, such that various ultrasonic waves reaching the guide face 140 may be reflected to propagate along a same direction. In other embodiments, the guide face 140 may be curved. A direction of a propagation path of the ultrasonic wave may be controlled by a shape of the guide face 140. Further, the curved guide face 140 may have smooth and mellow lines, providing an aesthetic appearance for the electronic device 100.

According to the present embodiment, the two guide portions 14 may be arranged at two edges of the body portion 12, and the guide face 140 of each of the two guide portions 14 may be inclined to the first side 102. Further, the two guide portions 14 directly face the ultrasonic wave transmitter 22 and the ultrasonic wave receiver 24 respectively. In such a way, the projections of the ultrasonic wave transmitter 22 and the ultrasonic wave receiver 24 onto the surface of the cover glass 10 may be minimized. As the surface of the cover glass 10 may refer to the display area of the electronic device, the display area occupied by the projections of the ultrasonic wave transmitter 22 and the ultrasonic wave receiver 24 may be minimized, and the screen-to-body ratio of the electronic device may be improved.

As shown in FIG. 1 and FIG. 2, the guide portion 14 may include a first guide portion 14a and a second guide portion 14b, symmetrically arranged at two opposing ends of the body portion 12. The ultrasonic wave transmitter 22 may be arranged to face the first guide portion 14a, and the ultrasonic wave receiver 24 may be arranged to face the second guide portion 14b. As shown in FIG. 3, the ultrasonic wave emitted by the ultrasonic wave transmitter 22 may enter the cover glass 10 from the end of the cover glass 10 along the direction perpendicular to the second side 104 of the cover glass 10. The ultrasonic wave may be reflected by the guide face 140 of the first guide portion 14a. In such a way, the ultrasonic wave may be reflected between the first side 102 and the second side 104 for a plurality of times and propagate towards the another end of the cover glass 10. When the ultrasonic wave propagates to reach the another end of the cover glass 10, the ultrasonic wave may be reflected by the guide face 140 of the second guide portion 14b and may be emitted out of the cover glass 10 along the direction perpendicular to the second side 104 of the cover glass 10. Specifically, as shown in FIG. 2, the first guide portion 14a and the second guide portion 14b may be arranged at two ends of the body portion 12 along a width direction of the body portion 12. In other words, the first guide portion 14a and the second guide portion 14b may be arranged at two ends along the X direction of the body portion 12 as shown in the figure. When the user is holding the electronic device 100 vertically, the X direction shown in the figure may be the width direction of the electronic device 100, and a Y direction shown in the figure may be a length direction of the electronic device 100. In the present embodiment, the first guide portion 14a and the second guide portion 14b may extend along the Y direction. That is, a length direction of the first guide portion 14a and a length direction of the second guide portion 14b may be parallel to the length direction of the body portion 12. The ultrasonic wave transmitter 22 and the ultrasonic wave receiver 24 may be arranged at two opposing ends of the body portion 12 along the width direction. The ultrasonic wave transmitter 22 may correspond to the first guide portion 14a, and the ultrasonic wave receiver 24 may correspond to the second guide portion 14b.

Figure 4:
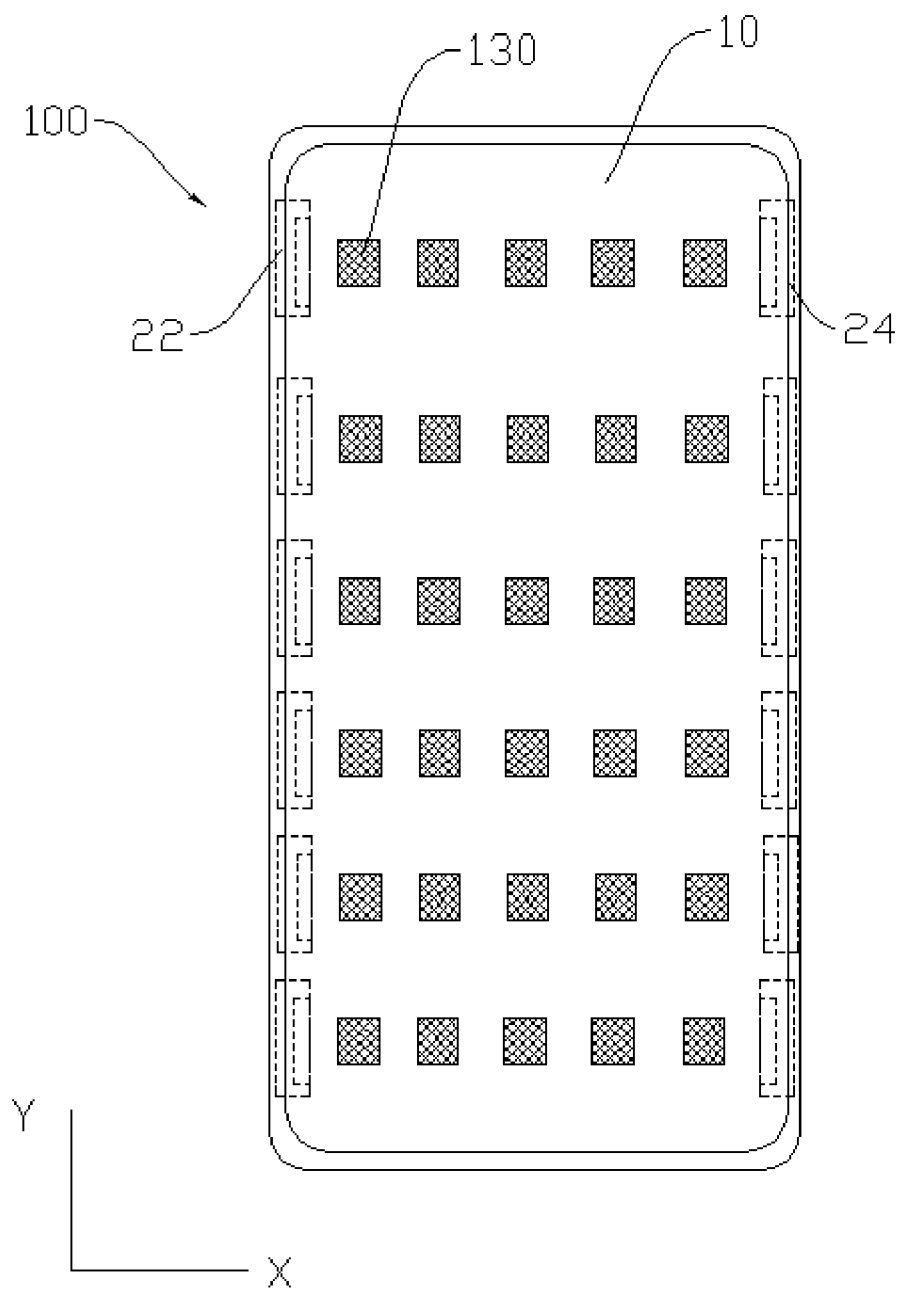
FIG. 4 is a structural schematic view of an implementation of the electronic device according to the embodiment shown in FIG. 1.

As shown in FIG. 4, in one embodiment, a plurality of ultrasonic wave transmitters 22 may be distributed along the length direction of the first guide portion 14a. A plurality of ultrasonic wave receivers 24 may be distributed along the length direction of the second guide portion 14b. Each ultrasonic wave transmitter 22 may work with each ultrasonic wave receiver 24 correspondingly. Specifically, the plurality of ultrasonic wave transmitters 22 may be distributed along the Y direction. Orthographic projections of the plurality of ultrasonic wave transmitters 22 onto the cover glass 10 may be located on the first guide portion 14a. The plurality of ultrasonic wave transmitters 22 may be spaced apart from each other, and distances between every two adjacent ultrasonic wave transmitters 22 may be identical.

The ultrasonic wave emitted by each ultrasonic wave transmitter 22 may enter the first guide portion 14a and may be reflected by the guide face 140 of the first guide portion 14a and propagate to the inside of the body portion 12. The plurality of ultrasonic wave receivers 24 may be distributed along the Y direction. Orthographic projections of the plurality of ultrasonic wave receivers 24 onto the cover glass 10 may be located on the second guide portion 14b. The plurality of ultrasonic wave receivers 24 may be spaced apart from each other, and distances between every two adjacent ultrasonic wave receivers 24 may be identical. The ultrasonic wave emitted out of the body portion 12 may enter the second guide portion 14b. The ultrasonic wave may be reflected by the guide face 140 of the second guide portion 14b, emitted out of the second guide portion 14b, and received by the plurality of ultrasonic wave receivers 24. In the present embodiment, each ultrasonic wave transmitter 22 may correspond to each ultrasonic wave receiver 24, such that each ultrasonic wave transmitter 22 may work with each ultrasonic wave receiver 24 correspondingly. Specifically, one ultrasonic wave transmitter 22 and one ultrasonic wave receiver 24 may be a component group and work correspondingly. Each component group may define a plurality of fingerprint identification areas 130 on the cover glass 10 correspondingly along the X direction. A plurality of component groups may be distributed along the Y direction, such that fingerprint identification areas 130 may be defined to cover the entire X-Y plane. That is, the fingerprint identification areas 130 may be defined to cover the entire first side 102. In one embodiment, distances between every two adjacent component groups may be reduced. That is, distances between every two adjacent ultrasonic wave transmitters 22 may be reduced, and distances between every two adjacent ultrasonic wave receivers 24 may be reduced. In such a way, a density of the plurality of fingerprint identification areas 130 may be increased, and the user may easily reach the fingerprint identification area 130, improving the efficiency of fingerprint identification. In one embodiment, the density of the plurality of fingerprint identification areas 130 may further be increased by various means, such as by reducing distances between the component group and a top edge of the cover glass and by providing an appropriate shape of the guide face of the guide portions, and full-screen fingerprint identification may be achieved.

As shown in FIG. 1, in the present embodiment, the display panel 32 may be arranged between the cover glass 10 and the ultrasonic wave transmitter 22. The display panel 32 may face towards the body portion 12. The orthographic projection of the ultrasonic wave transmitter 22 onto the cover glass 10 may at least partially overlap with an orthographic projection of the display panel 32 onto the cover glass 10. Further referring to FIG. 2, in the present embodiment, the nozzle 220 of the ultrasonic wave transmitter 2 may be defined to face towards the first guide portion 14a and may not be covered by the display panel 32, such that the ultrasonic wave emitted out of the nozzle 220 of the ultrasonic wave transmitter 22 may propagate towards the cover glass 10 directly, reducing the ultrasonic wave loss during the ultrasonic wave propagating to the cover glass 10. Therefore, an orthographic projection of portions of the ultrasonic wave transmitter 22 other than the nozzle 220 onto the cover glass 10 may be overlapped by the orthographic projection of the display panel 32 onto the cover glass 10 along the thickness direction (the Z direction) of the electronic device 100, such that a sum of a length of the ultrasonic wave transmitter 22 along the X direction and a length of the display panel 32 along the X direction may be reduced, and a width of the electronic device 100 may be reduced.

Further referring to FIG. 1 and FIG. 2, the orthographic projection of the ultrasonic wave transmitter 24 onto the cover glass 10 may at least partially overlap with the orthographic projection of the display panel 32 onto the cover glass 10. Specifically, as shown in FIG. 2, the nozzle 240 of the ultrasonic wave receiver 24 may face towards the second guide portion 14b and may not be covered by the display panel 32, such that the ultrasonic wave emitted out of the cover glass 10 may propagate to the nozzle 240 of the ultrasonic wave receiver 24, reducing the ultrasonic wave loss during the ultrasonic wave propagating from the cover glass 10 to the ultrasonic wave receiver 24. Therefore, an orthographic projection of portions of the ultrasonic wave receiver 24 other than the nozzle 240 onto the cover glass 10 may be overlapped by the orthographic projection of the display panel 32 onto the cover glass 10 along the thickness direction (the Z direction) of the electronic device 100, such that a sum of a length of the ultrasonic wave receiver 24 along the X direction and the length of the display panel 32 along the X direction may be reduced, and the width of the electronic device 100 may be reduced.

As shown in FIG. 1, in one embodiment, the electronic device 100 may further include a touch panel 34, arranged on the second side 104. Specifically, the touch panel 34 may be a transparent conductive layer formed on the cover glass 10, such as a layer made of ITO or the like. In the present embodiment, an orthographic projection of the touch panel 34 onto the cover glass 10 may be within the body portion 12 of the cover glass 10. The touch panel 34 may be arranged to not cover the guide portion 14, and that is, the guide portion 14 may be exposed to the nozzle 220 of the ultrasonic wave transmitter 22 and the nozzle 240 of the ultrasonic wave receiver 24, such that the ultrasonic wave entering or leaving the guide portion 14 may not be blocked by the touch panel 34. In another embodiment, the touch panel 34 may be a panel integrated with a touching function. The touch panel 34 may be arranged on the second side 104, and the cover glass 10 may be configured to protect the touch panel 34.

As shown in FIG. 1, in the present embodiment, the electronic device 100 may further include a shell 36. The display panel 32, the touch panel 34, and the cover glass 10 may be stacked sequentially to form a display screen module. The display screen module may be arranged to cover the shell 36 to define a receiving space 360. The ultrasonic wave transmitter 22 and the ultrasonic wave receiver 24 may be received in the receiving space 360. In one embodiment, the shell 36 may be metal or the like, such that components arranged inside the electronic device 100 may be protected. The shell 36 may further serve as an appearance component of the electronic device 100 to provide an aesthetic appearance for the electronic device 100.

Figure 5:
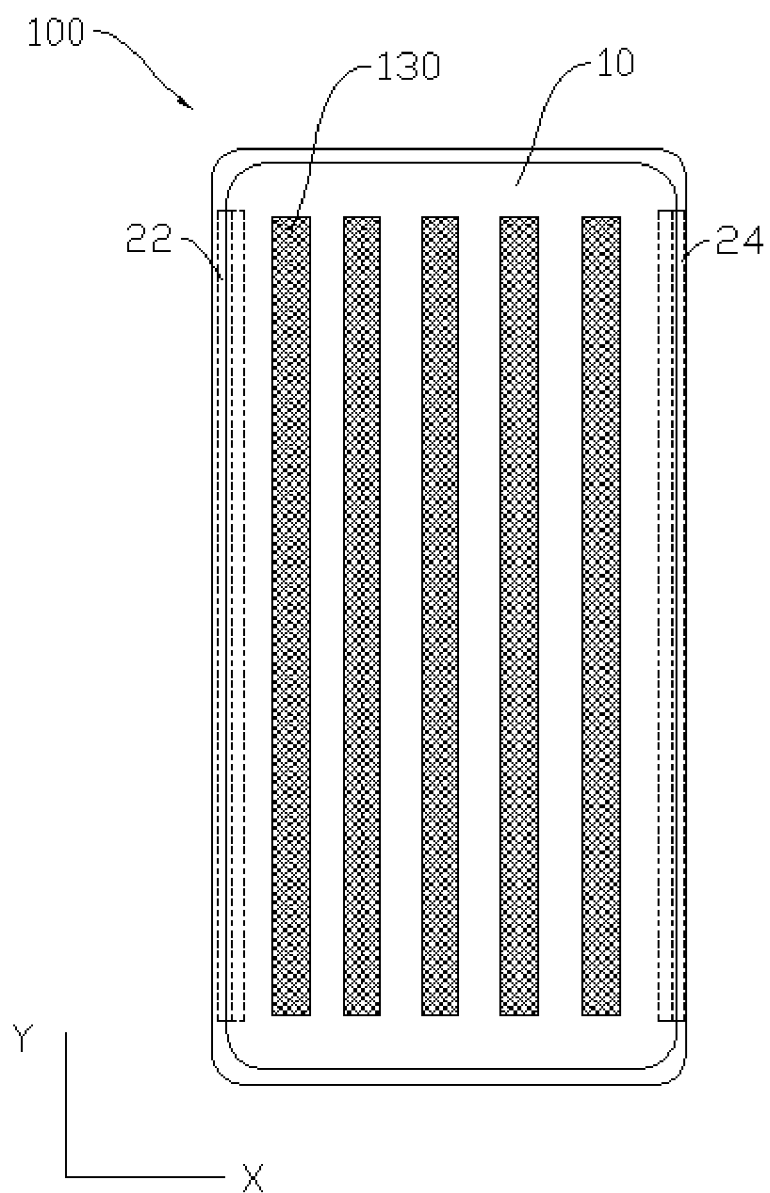
FIG. 5 is a structural schematic view of an electronic device according to a second embodiment of the present disclosure.

As shown in FIG. 5, the electronic device 100 according to the second embodiment of the present disclosure may be provided. Compared to the first embodiment, the ultrasonic wave transmitter 22 may be in a shape of a strip. A length direction of the ultrasonic wave transmitter 22 may be parallel to the length direction of the first guide portion 14a. The ultrasonic wave receiver 24 may be in the shape of the strip. A length direction of the ultrasonic wave receiver 24 may be parallel to the length direction of the second guide portion 14b. Specifically, the ultrasonic wave transmitter 22 may be arranged to extend along the Y direction, and the ultrasonic wave receiver 24 may be arranged to extend along the Y direction. The ultrasonic wave generated by the strip-shaped ultrasonic wave transmitter 22 may enter the first guide portion 14a. The ultrasonic wave may be reflected within the body portion 12, emitted out of the second guide portion 14b, and received by the ultrasonic wave receiver 24. The ultrasonic wave generated by the ultrasonic wave transmitter 22 may saturate the inside of the body portion 12 and cover the first side 102 of the cover glass 10, and the fingerprint identification area 130 defined on the first side 102 may cover the entire first side 102, such that full-screen fingerprint identification may be achieved.

The ultrasonic wave generated by the ultrasonic wave transmitter 22 may enter the cover glass 10 from an end of the cover glass 10, and may be emitted out of the cover glass 10 from another end of the cover glass 10 and received by the ultrasonic wave receiver 24. The ultrasonic wave may be reflected between the first side 102 and the second side 104 for a plurality of times. In such a way, the fingerprint identification area 130 may be defined on the first side 102. When the user's finger touches the fingerprint identification area 130, reflection effects of the ultrasonic wave caused by the ridge and the groove of the fingerprint may be different, the ultrasonic wave receiver may receive various ultrasonic wave information, and fingerprint information of the user may be identified. The ultrasonic wave transmitter 22 and the ultrasonic wave receiver 24 may be arranged on a side of the cover glass 10, and the surface area of the cover glass 10 may not be occupied. Correspondingly, the display area of the electronic device 100 may not be occupied, the electronic device 100 may exhibit the fingerprint identification function, and at the same time, the screen-to-body ration may not be impacted.

Figure 6:
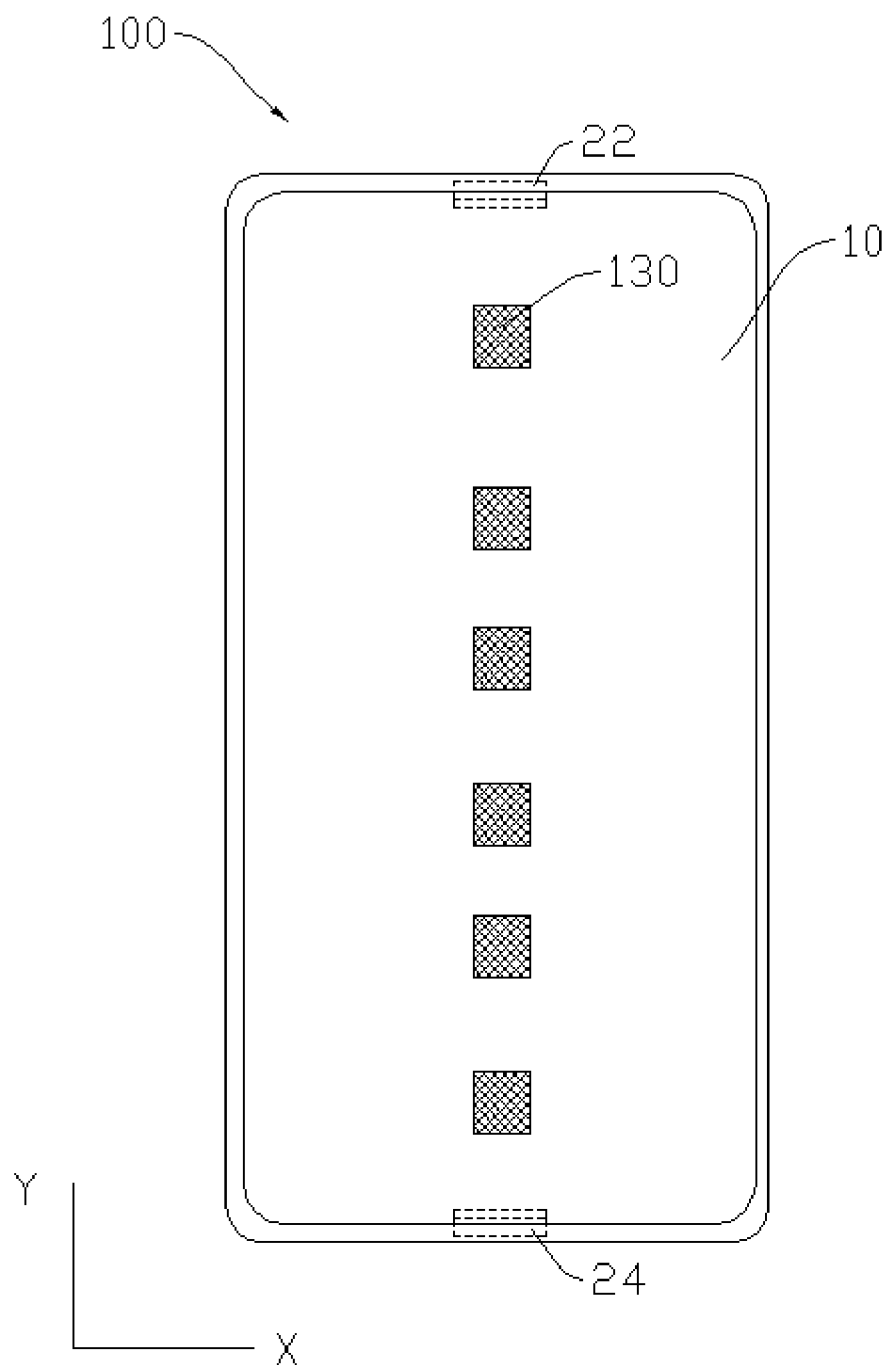
FIG. 6 is a structural schematic view of an electronic device according to a third embodiment of the present disclosure.

As shown in FIG. 6, the electronic device 100 according to the third embodiment of the present disclosure may be provided. The first guide portion 14a and the second guide portion 14b may be arranged at two ends of the body portion 12 along a length direction of the body portion 12. In other words, the first guide portion 14a and the second guide portion 14b may be arranged at two ends of a Y direction of the body portion 12 as shown in the figure. When the user is holding the electronic device 100 vertically, an X direction shown in the figure may be a width direction of the electronic device 100, and the Y direction shown in the figure may be the length direction of the electronic device 100. In the present embodiment, the first guide portion 14a and the second guide portion 14b may extend along the Y direction. That is, the length direction of the first guide portion 14a and the length direction of the second guide portion 14b may be parallel to the length direction of the body portion 12. The ultrasonic wave transmitter 22 and the ultrasonic wave receiver 24 may be arranged in correspondence to each other. The ultrasonic wave transmitter 22 may correspond to the first guide portion 14a, and the ultrasonic wave receiver 24 may correspond to the second guide portion 14b. In one embodiment, the microphone or the loudspeaker of the electronic device 100 may serve as the ultrasonic wave transmitter 22.

Figure 7:
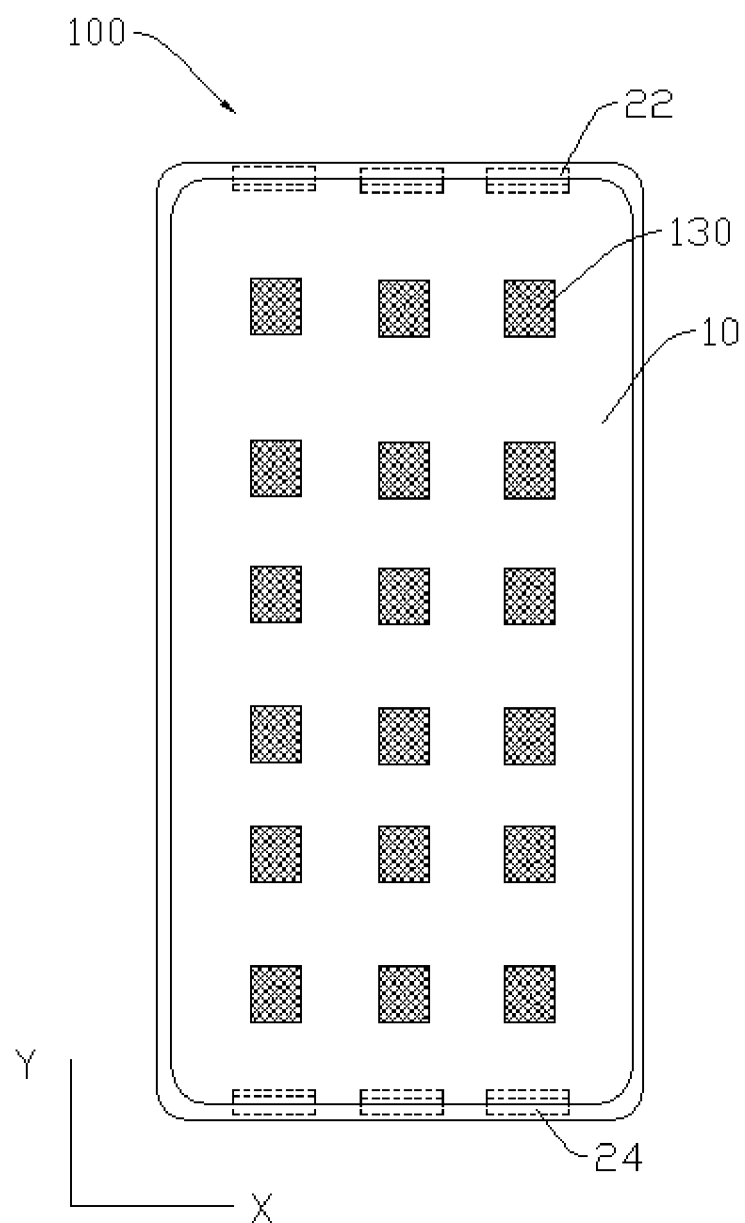
FIG. 7 is a structural schematic view of an implementation of the electronic device according to the third embodiment of the present disclosure.

As shown in FIG. 7, in one embodiment, a plurality of ultrasonic wave transmitters 22 may be distributed along the length direction of the first guide portion 14a. A plurality of ultrasonic wave receivers 24 may be distributed along the length direction of the second guide portion 14b. Each ultrasonic wave transmitter 22 may work with each ultrasonic wave receiver 24 correspondingly. Specifically, the plurality of ultrasonic wave transmitters 22 may be arranged long the X direction. Orthographic projections of the plurality of ultrasonic wave transmitters 22 onto the cover glass 10 may be located within the first guide portion 14a. Distances between every two adjacent ultrasonic wave transmitters 22 may be identical. The ultrasonic wave generated by each ultrasonic wave transmitter 22 may enter the first guide portion 14a and may be reflected by the guide face 140 of the first guide portion 14a to propagate to the inside of the body portion 12. The plurality of ultrasonic wave receivers 24 may be distributed along the X direction. Orthographic projections of the plurality of ultrasonic wave receivers 24 onto the cover glass 10 may be located within the second guide portion 14b. Distances between every two adjacent ultrasonic wave receivers 24 may be identical. The ultrasonic wave emitted from the body portion 12 may enter the second guide portion 14b and may be reflected by the guide face 140 of the second guide portion 14b and received by the plurality of ultrasonic wave receivers 24. In the present embodiment, each ultrasonic wave transmitter 22 may be arranged to correspond to each ultrasonic wave receiver 24, such that the ultrasonic wave transmitter 22 and the ultrasonic wave receiver 24 may work correspondingly. Specifically, one ultrasonic wave transmitter 22 and one ultrasonic wave receiver 24 may form a component group and work correspondingly. Each component group may define a plurality of fingerprint identification areas 130 on the cover glass 10 correspondingly along the Y direction. A plurality of component groups may be distributed along the X direction, such that fingerprint identification areas 130 may be defined to cover the entire X-Y plane. That is, the fingerprint identification areas 130 may be defined to cover the entire first side 102. In one embodiment, distances between every two adjacent component groups may be reduced. That is, distances between every two adjacent ultrasonic wave transmitters 22 may be reduced, and distances between every two adjacent ultrasonic wave receivers 24 may be reduced. In such a way, a density of the plurality of fingerprint identification areas 130 may be increased, and the user may easily reach the fingerprint identification area 130, improving the efficiency of fingerprint identification. In one embodiment, the density of the plurality of fingerprint identification areas 130 may further be increased, and full-screen fingerprint identification may be achieved.

Figure 8:
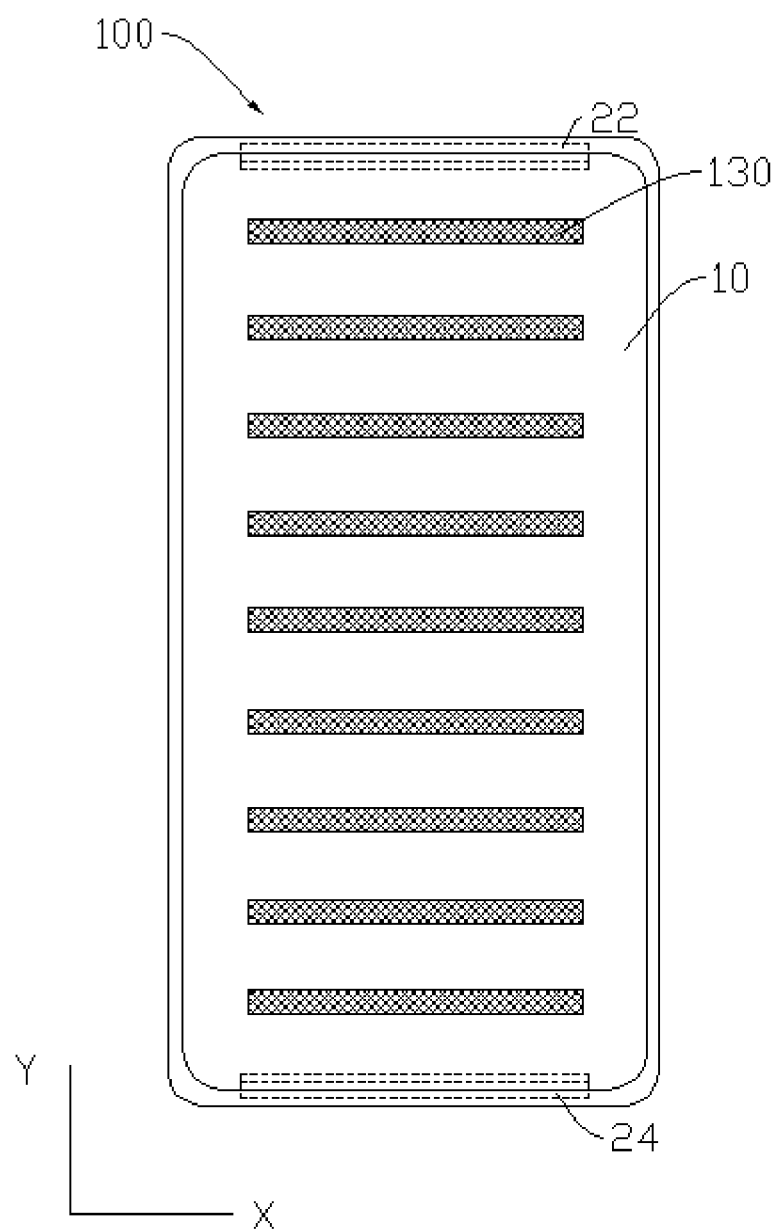
FIG. 8 is a structural schematic view of another implementation of the electronic device according to the third embodiment of the present disclosure.

As shown in FIG. 8, in another embodiment, the ultrasonic wave transmitter 22 may be in the shape of the strip. A length direction of the ultrasonic wave transmitter 22 may be parallel to the length direction of the first guide portion 14a. The ultrasonic wave receiver 24 may be in the shape of the strip. A length direction of the ultrasonic wave receiver 24 may be parallel to the length direction of the second guide portion 14b. Specifically, the ultrasonic wave transmitter 22 may be arranged to extend along the X direction, and the ultrasonic wave receiver 24 may be arranged to extend along the X direction. The ultrasonic wave generated by the strip-shaped ultrasonic wave transmitter 22 may enter the first guide portion 14a. The ultrasonic wave may be reflected within the body portion 12, emitted out of the second guide portion 14b, and received by the ultrasonic wave receiver 24. The ultrasonic wave generated by the ultrasonic wave transmitter 22 may saturate the inside of the body portion 12 and cover the first side 102 of the cover glass 10, and the fingerprint identification area 130 defined on the first side 102 may cover the entire first side 102, such that full-screen fingerprint identification may be achieved.

The ultrasonic wave generated by the ultrasonic wave transmitter 22 may enter the cover glass 10 from an end of the cover glass 10, and may be emitted out of the cover glass 10 from another end of the cover glass 10 and received by the ultrasonic wave receiver 24. The ultrasonic wave may be reflected between the first side 102 and the second side 104 for a plurality of times. In such a way, a plurality of fingerprint identification areas 130 may be defined on the first side 102. When the user's finger touches the fingerprint identification areas 130, reflection effects of the ultrasonic wave caused by the ridge and the groove of the fingerprint may be different, the ultrasonic wave receiver may receive various ultrasonic wave information, and fingerprint information may be identified. The ultrasonic wave transmitter 22 and the ultrasonic wave receiver 24 may be arranged to face a side of the cover glass 10, and the surface area of the cover glass 10 may not be occupied. Correspondingly, the display area of the electronic device 100 may not be occupied, the electronic device 100 may exhibit the fingerprint identification function, and at the same time, the screen-to-body ration may not be impacted.

As shown in FIG. 1 to 3, the electronic device 100 may include the cover glass 10, the ultrasonic wave transmitter 22 and the ultrasonic wave receiver 24. The ultrasonic wave transmitter 22 and the ultrasonic wave receiver 24 may be arranged on a same side of the cover glass 10 and arranged at two opposing ends of the same side of the cover glass 10. The ultrasonic wave transmitter 22 may emit the ultrasonic wave towards the cover glass 10. The ultrasonic wave may propagate through the cover glass 10, and may be reflected within the cover glass 10 and received by the ultrasonic wave receiver 24. The ultrasonic wave may be configured to collect fingerprint information of the user.

The cover glass 10 may be glass, such as tempered glass or the like, having high light transmittance and certain strength, such that components covered by the cover glass 10 may be protected.

Specifically, the ultrasonic wave transmitter 22 may be configured to generate the ultrasonic wave, and the ultrasonic wave receiver 24 may be configured to receive the ultrasonic wave. In one embodiment, the ultrasonic wave transmitter 22 may generate the ultrasonic wave, and the ultrasonic wave receiver 24 may receive the ultrasonic wave. The ultrasonic wave may not be recognized by human ears. In such a way, the user may not hear the noise created by the electronic device 100 during the electronic device 100 performing fingerprint identification, and a possibility of a sound generated by the ultrasonic wave transmitter 22 and a sound generated by a loudspeaker or a microphone being mixed to impact other functions of the electronic device 100 may be reduced.

In one embodiment, the nozzle 220 of the ultrasonic wave transmitter 22 may face towards an end of the cover glass 10, and the nozzle 240 of the acoustic receiver 24 may face towards another end of the cover glass 10.

In the present embodiment, the nozzle 220 of the ultrasonic wave transmitter 22 may face towards the cover glass 10, such that the ultrasonic wave emitted out of the nozzle 220 of the ultrasonic wave transmitter 22 may propagate to the cover glass 10 directly, and the ultrasonic wave loss during the ultrasonic wave propagating from the ultrasonic wave transmitter 22 to the cover glass 10 may be reduced. The nozzle 240 of the acoustic receiver 24 may face towards the cover glass 10, such that the ultrasonic wave emitted out of the cover glass 10 may propagate into the nozzle 240 of the ultrasonic wave receiver 24 directly, and the ultrasonic wave loss during the ultrasonic wave propagating from the cover glass 10 to the ultrasonic wave receiver 24 may be reduced.

In another embodiment, the cover glass 10 may include the first side 102 and the second side 104 opposing to the first side 102. The first side 102 may serve as at least a part of an appearance surface of the electronic device 100. The ultrasonic wave transmitter 22 and the ultrasonic wave receiver 24 may arranged at position closer to the second side 104 rather than the first side 102. The fingerprint identification area 130 may be defined on the first side 102.

The ultrasonic wave transmitter 22 may emit the ultrasonic wave to the cover glass 10. The ultrasonic wave may be reflected between the first side 102 and the second side 104 for a plurality of times and received by the ultrasonic wave receiver 24. Specifically, the ultrasonic wave generated by the ultrasonic wave transmitter 22 may enter the cover glass 10 from an end of the cover glass 10 and may be emitted out of the cover glass 10 from another end of the cover glass 10 and received by the ultrasonic wave receiver 24. The ultrasonic wave may be reflected between the first side 102 and the second side 104, and the fingerprint identification area 130 may be defined on the first side 102. When the user's finger touches the fingerprint identification area 130, reflection effects of the ultrasonic wave caused by the ridge and the groove of the fingerprint may be different, and the receiver may receive various ultrasonic wave information, such that fingerprint information of the user may be identified. In the present embodiment, the number of times the ultrasonic wave being reflected by the first side 102 may determine the number of fingerprint identification areas 130 defined on the first side 102. Specifically, the greater the number of times the ultrasonic wave being reflected by the first side 102, the greater the number of fingerprint identification areas 130 defined on the first side 102. In one embodiment, the number of times the ultrasonic wave being reflected by the first side 102 may be changed by changing an angle of the ultrasonic wave entering the cover glass 10. In other words, by increasing the angle of the ultrasonic wave entering the cover glass 10, i.e., increasing an angle between a direction of the ultrasonic wave entering the cover glass 10 and the first side 102, the number of times the ultrasonic wave being reflected by the first side 102 may be increased, the number of fingerprint identification areas 130 may be increased, an arrangement of the fingerprint identification areas 130 may be denser, such that practicability and the efficiency of the fingerprint identification may be improved while being used by the user. By decreasing the angle of the ultrasonic wave entering the cover glass 10, the number of fingerprint identification areas 130 may be reduced, a distance of the ultrasonic wave propagating within the cover glass 10 may be decreased, the ultrasonic wave loss may be reduced, and accuracy of fingerprint identification may be improved. In one embodiment, the first side 102 and the second side 104 of the cover glass 10 may be flat. In other embodiments, the first side 102 and the second side 104 may be curved. When the first side 102 and the second side 104 are curved, a radian of the first side 102 may be equal to a radian of the second side 104, and the first side 102 and the second side 104 may be arranged parallel to each other, such that a distance between various positions of the first side 102 and corresponding positions of the second side 104 may be identical. A plurality of fingerprint identification areas 130 may be defined on the first side 102 by reflecting the ultrasonic wave, and distances between every two adjacent fingerprint identification areas 130 may be identical. The plurality of fingerprint identification areas 130 may be evenly distributed on the first side 102, such that the user may easily recognize the fingerprint identification area 130 on the electronic device 100, improving an efficiency of unlocking the electronic device 100.

In still another embodiment, the cover glass 10 may include the body portion 12 and the guide portion 14. The guide portion 14 may be arranged at edges of the body portion 12. The guide portion 14 may face the ultrasonic wave transmitter 22 and the ultrasonic wave receiver 24.

In the present embodiment, the body portion 12 and the guide portion 14 may be an integrated structure. The first side 102 and the second side 104 may be two opposing side faces of the body portion 12. The first side 102 may extend towards the guide portion 14 to form the guide face 140. The guide face 140 may be inclined to the first side 102. The guide face 140 may be configured to reflect the ultrasonic wave to direct the ultrasonic wave to the inside of the body portion 12 or to the outside of the body portion 12.

In still another embodiment, the guide portion 14 may include the first guide portion 14a and the second guide portion 14b, symmetrically disposed at two opposite ends of the body portion 12. The ultrasonic wave transmitter 22 may be arranged to face the first guide portion 14a, and the ultrasonic wave receiver 24 may be arranged to face the second guide portion 14b. In such a way, the two guide portions may be arranged at two edges of the body portion 12, and the guide face 140 of each of the two guide portions 14 may be inclined to the first side 102. Further, the two guide portions 14 directly face the ultrasonic wave transmitter 22 and the ultrasonic wave receiver 24 respectively. In such a way, the projections of the ultrasonic wave transmitter 22 and the ultrasonic wave receiver 24 onto the surface of the cover glass 10 may be minimized. As the surface of the cover glass 10 may refer to the display area of the electronic device, the display area occupied by the projections of the ultrasonic wave transmitter 22 and the ultrasonic wave receiver 24 may be minimized, and the screen-to-body ratio of the electronic device may be improved.

Specifically, the ultrasonic wave generated by the ultrasonic wave transmitter 22 may enter the cover glass 10 from the end of the cover glass 10 along the direction perpendicular to the cover glass 10. The ultrasonic wave may be reflected by the guide face of the first guide portion 14a. In such a way, the ultrasonic wave may be reflected between the first side 102 and the second side 104 for a plurality of times and propagate towards the another end of the cover glass 10. When the ultrasonic wave propagates to reach the another end of the cover glass 10, the ultrasonic wave may be reflected by the guide face 140 of the second guide portion 14b and emitted out of the cover glass 10 along the direction perpendicular to the cover glass 10.

In still another embodiment, the nozzle 220 of the ultrasonic wave transmitter 22 may be defined to face towards the first guide portion 14a. The electronic device 100 may further include the display panel 32. The display panel 32 may be arranged between the cover glass 10 and the ultrasonic wave transmitter 22, and may not cover the nozzle 220 of the ultrasonic wave transmitter 22.

In the present embodiment, the nozzle 220 of the ultrasonic wave transmitter 22 may be defined to face towards the first guide portion 14a, and the display panel 32 may not cover the nozzle 220 of the ultrasonic wave transmitter 22, such that the ultrasonic wave emitted out of the nozzle 220 of the ultrasonic wave transmitter 22 may propagate to the cover glass 10 directly, and an ultrasonic wave loss during the ultrasonic wave propagating from the ultrasonic wave transmitter 22 to the cover glass 10 may be reduced.

As shown in FIG. 1 and FIG. 3, the electronic device 100 provided in the present embodiment may include the cover glass 10, the ultrasonic wave transmitter 22, and the ultrasonic wave receiver 24. The ultrasonic wave transmitter 22 may be configured to emit the ultrasonic wave, and the ultrasonic wave receiver 24 may be configured to receive the ultrasonic wave. When the ultrasonic wave transmitter 22 emits the ultrasonic wave to the cover glass 10, the ultrasonic wave may be reflected within the cover glass 10 and propagate to reach the ultrasonic wave receiver 24. The ultrasonic wave may be generated to collect fingerprint information of a finger touching the cover glass 10.

In one embodiment, the cover glass 10 may include the body portion 12 and the guide portion 14. The guide portion 14 may be arranged at two ends of the body portion 12. The guide portion 14 may face the ultrasonic wave transmitter 22 or the ultrasonic wave receiver 24.

In another embodiment, the guide portion 14 may include the first guide portion 14a and the second guide portion 14b. The first guide portion 14a and the second guide portion 14b may be disposed at two opposite ends of the body portion 12. The ultrasonic wave transmitter 22 may face the first guide portion 14a, and the ultrasonic wave receiver 24 may face the second guide portion 14b.

The embodiments of the present disclosure have been described in details. Specific examples are described in the present disclosure to illustrate the principle and implementations of the present disclosure. The above-mentioned embodiments may facilitate the understanding of the methods and essential concepts of the present disclosure. At the same time, to any one of skill in the art, based on the concepts of the present disclosure, embodiments and applications may be modified. Therefore, the above description should not limit the scope of the present disclosure.

What is claimed is:

1. An apparatus for fingerprint identification, comprising:
a cover glass, comprising a first side and a second side opposing to the first side; and
an ultrasonic wave transmitter and an ultrasonic wave receiver, arranged to face the second side of the cover glass, wherein
an orthographic projection of the ultrasonic wave transmitter onto the cover glass and an orthographic projection of the ultrasonic wave receiver onto the cover glass are located at two opposing ends of the cover glass, the ultrasonic wave transmitter is configured to emit an ultrasonic wave; and
when fingerprint identification is being performed, the ultrasonic wave enters the cover glass at one end of the cover glass and emerges on the other end of the cover glass, and the ultrasonic wave is being reflected between the first side and the second side until the ultrasonic wave is received by the ultrasonic wave receiver;
wherein the cover glass comprises a body portion and a guide portion, the body portion and the guide portion being integrally connected with each other;
wherein the guide portion is arranged at an edge of the body portion;
wherein the first side and the second side are arranged on the body portion;
wherein the first side is configured to extend along the guide portion to form a guide face, wherein the guide face is inclined to the first side; and
wherein the guide face is configured to direct ultrasonic wave in or out of the body portion by reflecting the ultrasonic wave.

2. The apparatus according to claim 1, wherein
the guide portion comprises a first guide portion and a second guide portion, the first guide portion and the second guide portion are disposed at two opposite ends of the body portion; and
the ultrasonic wave transmitter directly faces the first guide portion, and the ultrasonic wave receiver directly faces the second guide portion.

3. The apparatus according to claim 2, wherein
multiple ultrasonic wave transmitters are distributed along a length direction of the first guide portion;
multiple ultrasonic wave receivers are distributed along a length direction of the second guide portion; and
each ultrasonic wave transmitter corresponds to one ultrasonic wave receiver.

4. The apparatus according to claim 2, wherein
the ultrasonic wave transmitter is in a shape of a strip, a length direction of the ultrasonic wave transmitter is parallel to a length direction of the first guide portion; and
the ultrasonic wave receiver is in a shape of a strip, a length direction of the ultrasonic wave receiver is parallel to a length direction of the second guide portion.

5. The apparatus according to claim 2, wherein the first guide portion and the second guide portion are arranged at two ends along a length direction of the body portion.

6. The apparatus according to claim 2, wherein the first guide portion and the second guide portion are arranged at two ends along a width direction of the body portion.

7. The apparatus according to claim 1, further comprising a display panel, the display panel being positioned between the cover glass and the ultrasonic wave transmitter, wherein
the display panel directly faces the body portion; and
the orthographic projection of the ultrasonic wave transmitter onto the cover glass and an orthographic projection of the display panel onto the cover glass are at least partially overlapped.

8. The apparatus according to claim 7, wherein the orthographic projection of the ultrasonic wave receiver onto the cover glass and the orthographic projection of the display panel onto the cover glass are at least partially overlapped.

9. The apparatus according to claim 8, further comprising a touch panel, the touch panel being positioned on the second side.

10. A display apparatus, capable of performing fingerprint identification, comprising:
a display screen module, comprising a cover glass and a display panel covered by the cover glass, wherein the cover glass comprises a body portion and a guide portion arranged at an edge of the body portion; and
an ultrasonic wave transmitter and an ultrasonic wave receiver, wherein
the ultrasonic wave transmitter and the ultrasonic wave receiver are arranged on a same side of the cover glass and at two opposing ends of the same side of the cover glass;
the ultrasonic wave transmitter is configured to define a nozzle, the nozzle of the ultrasonic wave transmitter faces the guide portion, and the ultrasonic wave transmitter is configured to emit an ultrasonic wave to the cover glass through the nozzle of the ultrasonic wave transmitter;
when fingerprint identification is being performed, the ultrasonic wave propagates through the cover glass and is being reflected within the cover glass;
the ultrasonic wave receiver is configured to define a nozzle, the nozzle of the ultrasonic wave receiver faces the guide portion, and the ultrasonic wave receiver is configured to receive the ultrasonic wave emitted out of the cover glass; and the ultrasonic wave is configured to collect fingerprint information of a user.

11. The display apparatus according to claim 10, wherein the cover glass comprises a first side and a second side opposing to the first side;
the first side is arranged to serve as at least a part of an appearance surface of an electronic device;
the ultrasonic wave transmitter and the ultrasonic wave receiver are arranged closer to the second side rather than the first side; and
a fingerprint identification area is defined on the first side.

12. The display apparatus according to claim 11, wherein the body portion and the guide portion are integrally connected with each other;
the first side and the second side are two opposing sides of the body portion;
the first side is configured to extend along the guide portion to form a guide face; and
the guide face is curved and inclined to the second side, and the guide face is configured to reflect the ultrasonic wave to direct the ultrasonic wave in or out of the body portion.

13. The display apparatus according to claim 10, wherein the guide portion comprises a first guide portion and a second guide portion, symmetrically arranged at two opposing ends of the body portion; and
the nozzle of the ultrasonic wave transmitter is defined to face the first guide portion, the nozzle of the ultrasonic wave receiver is defined to face the second guide portion.

14. The display apparatus according to claim 13, wherein the display panel is positioned between the cover glass and the ultrasonic wave transmitter; and
the display panel is arranged to not cover the nozzle of the ultrasonic wave transmitter, such that the nozzle of the ultrasonic wave transmitter is exposed to the first guide portion directly.

15. The display apparatus according to claim 14, wherein the display panel is positioned between the cover glass and the ultrasonic wave receiver, and the display panel is arranged to not cover the nozzle of the ultrasonic wave receiver, such that the nozzle of the ultrasonic wave receiver is exposed to the second guide portion directly.

16. An electronic device, comprising:
a shell;
a display screen module, comprising a cover glass and a display panel covered by the cover glass, wherein the display screen module is engaged with the shell to define a receiving space, and the cover glass comprises a body portion and a guide portion arranged at an edge of the body portion; and
an ultrasonic wave transmitter and an ultrasonic wave receiver, received in the receiving space, wherein
the ultrasonic wave transmitter is configured to emit an ultrasonic wave, the ultrasonic wave receiver is configured to receive the ultrasonic wave;
when ultrasonic wave transmitter emits the ultrasonic wave towards the cover glass, a guide face of the guide portion is configured to reflect the ultrasonic wave to guide the ultrasonic wave in or out of the body portion, enabling the ultrasonic wave to propagate to reach the ultrasonic wave receiver; and
the ultrasonic wave is configured to collect fingerprint information of a user.

17. The electronic device according to claim 16, wherein the guide portion is arranged at two ends of the body portion, and the guide portion directly faces the ultrasonic wave transmitter or the ultrasonic wave receiver.

18. The electronic device according to claim 17, wherein the ultrasonic wave transmitter defines a nozzle to emit the ultrasonic wave, the ultrasonic wave receiver defines a nozzle to receive the ultrasonic wave;
the display panel is positioned between the cover glass and the ultrasonic wave transmitter and between the cover glass and the ultrasonic wave receiver; and
the display panel is arranged to not cover the nozzle of the ultrasonic wave transmitter and the nozzle of the ultrasonic wave receiver, such that the nozzle of the ultrasonic wave transmitter is exposed to a first guide portion directly, and the nozzle of the ultrasonic wave receiver is exposed to a second guide portion directly.

19. The electronic device according to claim 16, wherein the body portion and the guide portion are integrally connected with each other; and
the guide face is curved.

* * * * *